United States Patent
Roychowdhury et al.

(10) Patent No.: US 12,361,431 B2
(45) Date of Patent: Jul. 15, 2025

(54) SYSTEMS AND METHODS FOR REMOTELY RETRIEVING SENSITIVE DATA IN CLOUD COMPUTING SYSTEMS FEATURING SHARED DATA REPOSITORIES

(71) Applicant: Capital One Services, LLC, McLean, VA (US)

(72) Inventors: Arjun Roychowdhury, McLean, VA (US); Martin W. Dewey, McLean, VA (US); Raghunath Valluri, McLean, VA (US); Marie Gutgesell, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 127 days.

(21) Appl. No.: 18/318,932

(22) Filed: May 17, 2023

(65) Prior Publication Data
US 2024/0386431 A1    Nov. 21, 2024

(51) Int. Cl.
| | |
|---|---|
| *G06Q 20/38* | (2012.01) |
| *G06F 16/00* | (2019.01) |
| *G06F 21/62* | (2013.01) |
| *G06Q 20/40* | (2012.01) |

(52) U.S. Cl.
CPC ..... *G06Q 20/40975* (2013.01); *G06Q 20/382* (2013.01)

(58) Field of Classification Search
CPC .................. G06Q 20/40975; G06Q 20/382
USPC ........................................................ 705/44
See application file for complete search history.

(56) References Cited

U.S. PATENT DOCUMENTS

| | | | |
|---|---|---|---|
| 2012/0324242 A1* | 12/2012 | Kirsch | G06Q 20/0855 713/189 |
| 2017/0187693 A1* | 6/2017 | Chandramouli | H04L 63/20 |
| 2019/0026732 A1* | 1/2019 | Velummylum | G06Q 20/123 |
| 2019/0034643 A1* | 1/2019 | Kludy | G06Q 20/382 |
| 2020/0380161 A1* | 12/2020 | Gutta | G06Q 20/382 |
| 2024/0364745 A1* | 10/2024 | Martinez | H04L 12/6418 |

* cited by examiner

*Primary Examiner* — Clifford B Madamba
(74) *Attorney, Agent, or Firm* — Foley & Lardner LLP (57) ABSTRACT

Systems and methods that use an abstraction layer (e.g., a logical entity layer) that reinterprets API requests in order to prevent unrequested and/or unauthorized data to be served in an API request. The abstraction layer accomplishes this by determining a characteristic of the composite field set that is to be returned based on a request from an API for a first field set. The system may then determine an API request mapping. The abstraction layer may then generate a substitute request corresponding to the field attribute using the API request mapping, wherein the substitute request modifies the first request to exclude data in a potential composite field set to exclude data not specifically requested (e.g., a second field set in the composite field).

20 Claims, 4 Drawing Sheets

SYSTEMS AND METHODS FOR REMOTELY RETRIEVING SENSITIVE DATA IN CLOUD COMPUTING SYSTEMS FEATURING SHARED DATA REPOSITORIES

BACKGROUND

Cloud computing, the practice of using a network of remote servers hosted on the Internet to store, manage, and process data, rather than a local server or a personal computer, is gaining steam. Key benefits to the use of cloud computing are its flexibility and scalability as users are no longer required to invest in physical resources. In a similar vein to cloud computing, data storage solutions such as data lakes, which are centralized repositories that store structured and unstructured data at any scale, and/or data warehouses, which store data in a structured manner, are increasingly used. The combination of cloud computing and varying data storage solutions has vastly increased the case of access, scalability, and/or efficiency of data storage.

Moreover, as the size of and accessibility to data storage solutions is seemingly unlimited, data storage solutions are often structured as shared data repositories. That is, a data storage solution is often shared by multiple entities that may store, access, and/or modify data in furtherance of one or more projects or applications. To store, access, and/or modify data in the shared data repositories, each entity, project, and/or application may use a different application programming interface (API). Each of these APIs may act as a bridge between the shared data repository and the respective entity, project, and/or application. As such, each of these APIs may issue commands to the shared data repository related to the data therein. The shared data repository may then respond to the commands by sending data to the respective entity, project, and/or application.

SUMMARY

The use of a shared data repository, and in particular a shared data repository that serves different entities, projects, and/or applications, each of which may use a different API, raises a novel technical problem. Specifically, the different APIs may issue similar commands for data that is stored in a variety of formats and spread across numerous fields of the shared data repositories. For example, both a first API and a second API may request data (e.g., issue a command) for "a network address." However, the content needed to serve the request may differ slightly.

For example, the first API may distinguish "a network address" from an Internet Protocol (IP) address, whereas the second API may not (e.g., the first part of an IP address may be referred to as a network address, whereas the last part may be referred to as a host address). In such cases, the first API may require only the first part of the IP address (e.g., a first field set of the shared data repository), whereas the second API may require both the first part and the second part of the IP address (e.g., a first field set and a second field set of the shared data repository). In order to ensure that the necessary data is provided to either API, one solution of a shared data repository is to send both parts to the requesting API (e.g., generate and send a composite field set that includes both the first field set and the second field set). That is, the conventional shared data repository may rely on the receiving API to filter and select the appropriate information from a composite field set.

However, in instances involving sensitive data such as Personal Identifiable Information (PII), which may comprise information that permits the identity of an individual to whom the information applies to be reasonably inferred by either direct or indirect means, and/or other non-public or private data, the aforementioned solution creates yet another novel technical problem. For example, the shared data repository may inadvertently share sensitive data with an API. Moreover, as the definition of the sensitive data may differ based on the respective API, entity, project, and/or application (e.g., different data may allow different entities to "reasonably infer" the identity of an individual), and the authorization to have different types of sensitive data may also differ based on the respective API, entity, project, and/or application, the transmission of this data creates a security and/or privacy issue. Furthermore, this security and/or privacy issue occurs even if the sensitive data is filtered out and/or discarded upon receipt by the respective API, entity, project, and/or application.

Accordingly, systems and methods are described herein for novel uses and/or improvements to cloud computing and/or remote data storage, in particular routing data and enforcing standardization of data in a federated way. In one example, systems and methods are described herein for improvement to remotely retrieving sensitive data in cloud computing systems featuring shared data repositories. For example, in order to overcome the novel technical problem discussed above, the systems and methods introduced an abstraction layer (e.g., a Logical Entity Layer (LEL)) that reinterprets API requests in order to prevent unrequested and/or unauthorized data to be served in an API request. The abstraction layer accomplishes this by determining a characteristic of the composite field set that is to be returned based on a request from an API for a first field set. The system may then determine an API request mapping. For example, the API request mapping may describe how the request from the specific API (and/or for the first field set) maps to the data in the shared data repository (or a composite field set that is to be returned in response to the API request). The abstraction layer may then generate a substitute request corresponding to the field attribute using the API request mapping, wherein the substitute request modifies the first request to exclude data in a potential composite field set to exclude data not specifically requested (e.g., a second field set in the composite field). By doing so, the abstraction layer avoids the potential security and/or privacy issue cited above in relation to remotely retrieving sensitive data in cloud computing systems featuring shared data repositories.

In some aspects, systems and methods remotely retrieving sensitive data in cloud computing systems featuring shared data repositories accessible from a plurality of APIs are described. For example, the system may receive, at an abstraction layer, a first request, from a first device, for a first encrypted field set, wherein the first encrypted field set is stored on a shared data repository for a cloud computing system. The system may, in response to the first request, determine, by the abstraction layer, a first composite field set of the shared data repository that comprises the first encrypted field set, wherein the first composite field set comprises the first encrypted field set and a second encrypted field set. The system may determine a first field attribute for the first composite field set. The system may select, based on the first request, a first API request mapping from a plurality of API request mappings. The system may generate, using the first API request mapping, a second request corresponding to the first field attribute. The system may query, using the second request, the shared data repository for the first encrypted field set. The system may generate for display, on a user interface of the first device, data for the first encrypted field set.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
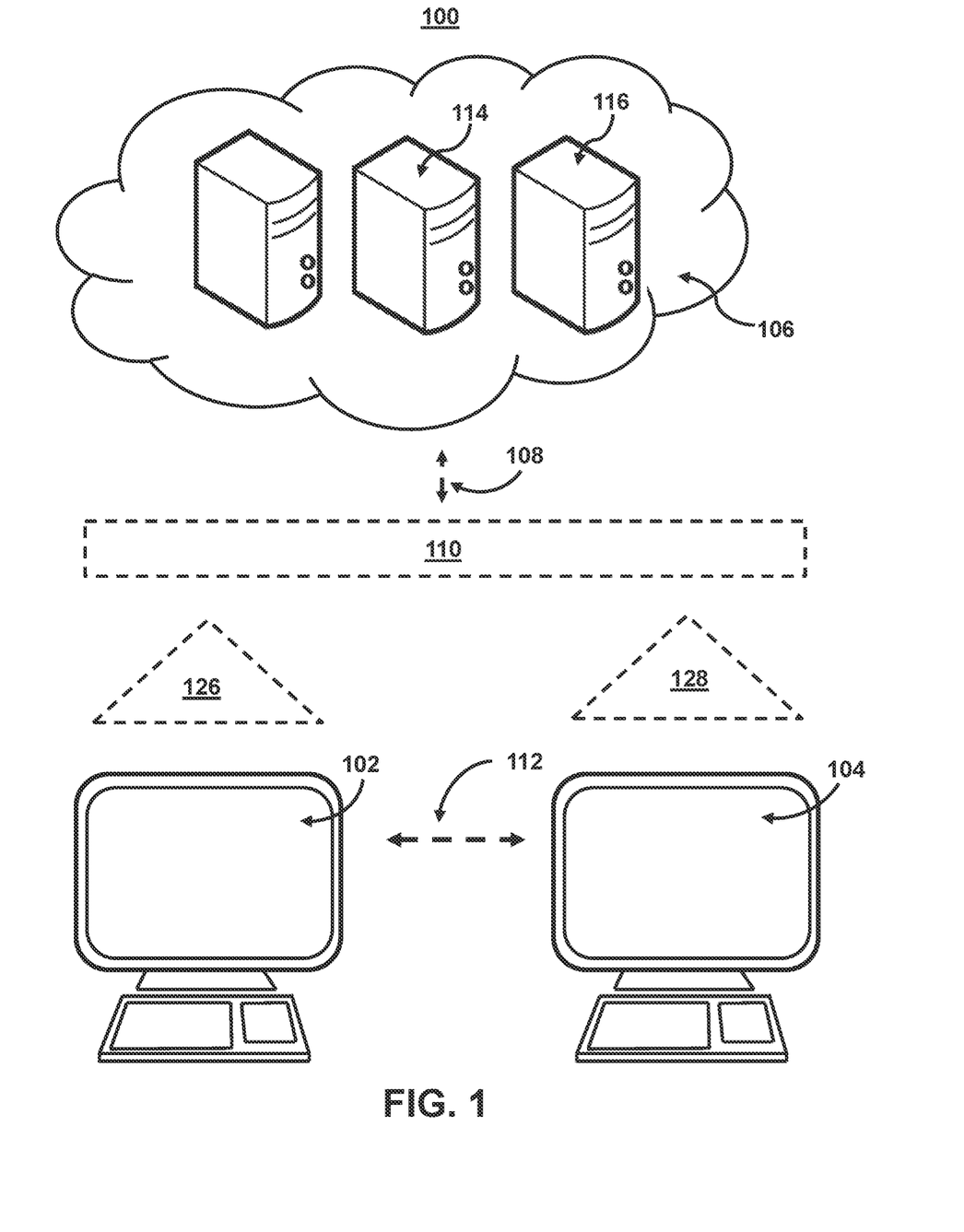
FIG. 1 shows an illustrative system for retrieving sensitive data in cloud computing systems, in accordance with one or more embodiments.

FIG. 1 shows an illustrative diagram for retrieving sensitive data in cloud computing systems, in accordance with one or more embodiments. For example, FIG. 1 shows system 100 for retrieving sensitive data in cloud computing systems, in accordance with one or more embodiments. As shown in FIG. 1, system 100 includes client device 102 and client device 104 (and/or other components not shown). Each of client devices 102 and 104 may include any type of mobile terminal, fixed terminal, or other device. Each of these devices may receive content and data via input/output (I/O) paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 102 and 104 may include a desktop computer, a notebook computer, a tablet computer, a smartphone, a wearable device, or other client device. Users may, for instance, utilize one or more client devices 102 and 104 to interact with one another, one or more servers, or other components of system 100. It should be noted that, while one or more operations are described herein as being performed by particular components of client devices 102 or 104, those operations may, in some embodiments, be performed by other components of client devices 102 or 104 or other components of system 100. As an example, while one or more operations are described herein as being performed by components of client device 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

System 100 involves the use of an LEL (e.g., abstraction layer 110) to keep data at the data producers (i.e., their own data stores) thus limiting security and/or privacy risks of transmitting data. For example, the LEL is a fabric that allows distributed access to data across multiple sources. As part of this process, the LEL may abstract data locations from users to increase security and be resilient to backend changes of data sources. The LEL may incentivize producers to standardize their data as part of the onboarding process (and therefore be responsible stewards of data). The LEL may reduce time to market from analysis to production timeline as in conventional systems, analysts use SQL on lakes, production systems use Spark or APIs with operational stores. The LEL helps abstracting this difference by offering a common access mechanism thereby reducing code change/time to market. The LEL may also reduce the need for continuous development of data pipelines (e.g., the LEL may be the common data pipeline). The LEL may also allow for dynamic composability from consumers to access data they need without having to create static table views.

Each of these devices may also include electronic storages (e.g., non-transitory, computer-readable media). The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

As shown in FIG. 1, client device 102 may comprise a user interface for transmitting requests and receiving data. For example, system 100 may remotely store and/or communicate data (e.g., sensitive data, security credentials, etc.) in cloud computing systems featuring shared data repositories using dynamically selected API request mappings.

For example, the system may receive, at abstraction layer 110, a first request, from a first device (e.g., client device 102), for a first encrypted field set, wherein the first encrypted field set is stored on a shared data repository (e.g., shared data repository 106) for a cloud computing system. In some embodiments, the encrypted field set may comprise content such as encrypted data that is securely stored such as PII. API keys, passwords, certificates, and/or other sensitive data. The system may encrypt this data in order to store it securely on a cloud-based system. For example, the system may encrypt data by scrambling data so that only authorized parties may understand the information. For example, the system may convert human-readable plaintext to incomprehensible text (e.g., ciphertext). As such, the system takes readable data and alters it so that it appears random. In some embodiments, the system may require the use of a cryptographic key, which may be a set of mathematical values that both a sender and a recipient of an encrypted message agree on.

In some embodiments, abstraction layer 110 may comprise an LEL that leverages enterprise capabilities to make data discovery and consumption easier for consumers, while incentivizing producers to become authoritative. For example, well-governed sources of data will be key to solving data-related challenges that hamper real-time, intelligent solutions. In some embodiments, the LEL may comprise a metadata store that is a catalog accurately describing data sets and APIs and has a capability of particular data sets and APIs to be marked as authoritative. The LEL may also comprise a discovery service that allows for consumers looking to access authoritative data to find what they need easily and filter based on tags, metadata, and data that are marked as authoritative. The LEL discovery service may be a core engine that will provide the ability to receive partial keywords and return contextual Data Product information that matches the keywords provided to enable multiple front-end interfaces to integrate with LEL discovery features. The LEL may also comprise a composable data query interface that will allow consumers to access authoritative data across Data Products. The LEL user interface may exist on top of Data Product APIs. The LEL may also comprise support to producers to map their existing data to agreed-upon data models for their data and a collection of Data Products—authoritative APIs, streams, and data sets—owned by different teams across a company.

For example, in one embodiment, the system may retrieve two Data Products, one is "Payments," and the other is "Account Information." Both Data Products may comprise PII information and/or other sensitive data about a user. However, in one use case, an application may only need account ID and payment balance. The other application may need account ID, social security numbers, and payment transactions for last 30 days. In a conventional approach, both use-cases would access the respective APIs for both Data Products. The APIs would retrieve all data available and filter out the needed data. In the present case, using the LEL, the user may ask for exactly what data is needed and only receive that specific information. Accordingly, any other PII and/or sensitive data is not transmitted (and thus not exposed to a security or privacy risk). Moreover, the LEL may dynamically request different shapes, formats, types, etc. of data and/or subsets of that data without needing to create custom/static views (e.g., to filter through).

The system may use symmetric encryption and/or asymmetric encryption. In symmetric encryption, there is only one key, and all communicating parties use the same (secret) key for both encryption and decryption. In asymmetric, or public key, encryption, there are two keys: one key is used for encryption, and a different key is used for decryption. The decryption key is kept private (hence the "private key" name), while the encryption key is shared publicly for anyone to use (hence the "public key" name). Asymmetric encryption is a foundational technology for TLS (often called SSL).

Client devices 102 and client devices 104 may transmit one or more API requests (e.g., via API 126 and API 128) to abstraction layer 110. The abstraction layer 110 may comprise a fully managed cloud-based, zero-knowledge platform for securing infrastructure secrets such as API keys, database passwords, access keys, certificates, and any type of confidential data.

As shown in FIG. 1, API 126 and/or API 128 may comprise an API layer that performs one or more functions related to storing and/or monitoring security credentials and/or other secured data in cloud computing systems. API 126 (or a respective plugin thereof) may allow the system to generate recommendations, transmit data, and/or access remote storage across different devices. API 126 (which may be A REST or web services API layer) may provide a decoupled interface to data and/or functionality of one or more applications. API 126 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API 126 may use various architectural arrangements. For example, system 100 may be partially based on API 126, such that there is strong adoption of SOAP and RESTful web services, using resources like Service Repository and Developer Portal, but with low governance, standardization, and separation of concerns. Alternatively, system 100 may be fully based on API 126, such that separation of concerns between layers like API 126, services, and applications are in place.

In some embodiments, the system architecture may use a microservice approach. Such systems may use two types of layers: front-end layer and back-end layer where microservices reside. In this kind of architecture, the role of the API 126 may provide integration between front end and back end. In such cases, API 126 may use RESTful APIs (exposition to front end or even communication between microservices). API 126 may use AMQP (e.g., Kafka, RabbitMQ, etc.). API 126 may use incipient usage of new communications protocols such as gRPC, Thrift, etc.

In some embodiments, the system architecture may use an open API approach. In such cases, API 126 may use commercial or open-source API platforms and their modules. API 126 may use a developer portal. API 126 may use strong security constraints applying WAF and DDOS protection, and API 126 may use RESTful APIs as standard for external integration.

Abstraction layer 110 may also access, select, and/or generate one or more API request mappings. As described herein, an API request mapping may be a component of an API that defines a function template for the API parser and API server to work with a third-party system (e.g., a cloud computing system). Abstraction layer 110 may select from available API request mappings based on one or more characteristics. For example, abstraction layer 110 may determine an API request mapping for a first field attribute for the first composite field set (e.g., a first user account, cloud computing platform, etc.). Additionally or alternatively, abstraction layer 110 may determine an API request mapping corresponding to a first device (e.g., client device 102), a first API (e.g., API 126), and/or a command (e.g., a command for a specific field set). For example, abstraction layer 110 may select a first API request mapping from a plurality of API request mappings that corresponds to the first API and the first field attribute.

For example, a field attribute may comprise a content characteristic, a metadata characteristic, passwords, access codes, technical specifications, connectivity standards or protocols, and/or other relevant or related procedures that are necessary to allow the system (or any authorized users) to access the encrypted field set and/or any other data that may distinguish one field set from another (or distinguish a field set from other fields in a composite field set). In some embodiments, a field attribute may be specific to a hardware or software system. For example, the system may determine whether a particular device (or type of device) may access a composite field set. To do so, the system may retrieve an identifier for the hardware and/or software and compare the identifier to one or more identifiers approved by the field attribute. In some embodiments, the system may determine whether a particular API request mapping may access a field set in a composite field set. To do so, the system may retrieve an identifier for the API request mapping and compare the identifier to one or more identifiers approved by the field attribute.

In some embodiments, the system may require a particular API to access a field set in a composite field set. For example, the system may determine whether a particular API request mapping may access a field set in a composite field set. To do so, the system may retrieve an identifier for the API request mapping and compare the identifier to one or more identifiers approved by the field attribute.

In some embodiments, an API may also include a back-end routing component, a database where the application may store data, and/or a dedicated server that may access the Internet. In some embodiments, the system may use these "API characteristics" to determine whether or not a given API may be used to access a field set in a composite field set. For example, the composite field set may establish security and/or other requirements for access.

For example, the system may select an API request mapping that both conforms to the API of a requesting device as well as the field attribute. An API request mapping may comprise a component to define a function template for an API parser and/or API server to work with a third-party system. The API request mapping may support both read and write functions, allowing users to view, create, and/or modify the content.

System 100 comprises abstraction layer 110, which may comprise an API layer, an API, and/or an API request mapping that may transmit a set of Hypertext Transfer Protocol (HTTP) request messages and a definition of the structure of response messages. In some embodiments, the API may allow a software application, which is written against the API and installed on a client device (such as, for example, a computing device associated with a user), to exchange data with a server (such as, for example, a computing system associated with a cloud computing system) that implements the API in a request-response pattern. In certain embodiments, the request-response pattern defined by the API may be configured in a synchronous fashion and require that the response be provided in real time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/json" content type. In another embodiment, the API design may also require the server implementing the API to return messages in JSON format in response to the request calls from the client.

Abstraction layer 110 may function to store secured data, rotated and/or refreshed stored data, and/or perform other functions. In some embodiments, the system may require a particular client (e.g., a proxy) to access the composite field set. For example, the system may determine whether a particular client may access a field set in a composite field set. To do so, the system may retrieve an identifier for the client and compare the identifier to one or more identifiers approved by the field attribute. For example, the system may select, based on the first request, a first computer client of a plurality of computer clients. The system may then determine to query the shared data repository for the first encrypted field set using the first computer client as a proxy.

The client may be a piece of computer hardware or software that accesses a service made available by a server as part of the client-server model of computer networks. The server may be another computer system, in which case the client accesses the service by way of the network. For example, the system may require that the request for data is transmitted using a specific client in order to improve security.

FIG. 1 also includes communication paths 108 and 112. Communication paths 108 and 112 may include the Internet, a mobile phone network, a mobile voice or data network (e.g., a 4G or LTE network), a cable network, a public switched telephone network, or other type of communications network or combinations of communications networks. Communication paths 108 and 112 may separately or together include one or more communications paths, such as a satellite path, a fiber-optic path, a cable path, a path that supports Internet communications (e.g., IPTV) or free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As referred to herein, a composite field set may comprise any partitioning of one or more data structures (e.g., fields in a database), computers, accounts, networks, and/or other groups of data storage. In some embodiments, the composite field set may comprise a network domain, which itself may comprise an administrative grouping of multiple private computer networks or local hosts within the same infrastructure. In such cases, the system may identify domains using a domain name and/or a globally unique name within the Domain Name System (DNS). Additionally or alternatively, the system may act as a domain controller that automates the logins, user groups, and architecture of a domain, rather than manually coding this information on each host in the domain. A composite field set may comprise one or more field sets that are determined to be responsive to a request. In some embodiments, a composite field set may comprise one or more field sets that are determined to be responsive to a request based on the request characteristics of one or more APIs supported by the shared data repository.

Communication paths 108 and 112 may define a network and/or a composite field set. In some embodiments, the composite field set may comprise a subset of accounts (e.g., corresponding to a particular user, entity, and/or group of users/entities). In such cases, a user account may be created, by the system, for a person in a computer or computing system. The system may also create user accounts for machine entities, such as service accounts for running programs, system accounts for storing system files and processes, and root and administrator accounts for system administration.

In some embodiments, the composite field set may comprise a cloud computing platform. In such cases, a cloud computing platform may refer to the operating system and/or hardware of a server in an Internet-based data center. The platform may allow software and hardware products to coexist remotely and at scale.

Furthermore, as the use of the dynamically selected API request mappings allows access to the shared data repositories, the system may additionally make requests for information on one or more characteristics of usage or storage of data in shared data repositories. The system may then compare this information to requirements of the system to provide recommendations to provide the centrally managed security, monitoring (including for both risk and compliance measures), and/or management for secured data.

For example, the system may receive, at abstraction layer 110, a first request, from a first device, to retrieve a first encrypted field set for a first encrypted field set, wherein the first encrypted field set is stored on a cloud computing system, and wherein the first encrypted field set indicates one or more characteristics of usage or storage of the first encrypted field set in the shared data repository. In some embodiments, the system may access one or more field sets corresponding to the access and/or use of one or more cloud services. The field set may be specific to a particular group, entity, data set, secret, composite field set, etc. For example, the system may receive a request for a field set corresponding to a particular user account that indicates the access to and use of secured data for the account. In another example, the system may receive a request for a field set corresponding to a particular device that indicates the access to and use of secured data for the device. In another example, the system may receive a request for a field set corresponding to a particular composite field set that indicates the access to and use of secured data for the composite field set. In another example, the system may receive a request for a field set corresponding to a particular user account that indicates the access to and use of secured data for the secured data.

In some embodiments, the field set may indicate one or more access and/or usage characteristics over a given time period. For example, server 114 (FIG. 1) may receive a first encrypted field set from a first cloud services recipient (client device 102 (FIG. 1)), in which the first encrypted field set includes cloud resources accessed by a user during a first time period (e.g., a given hour, day, week, etc.). For example, the field set may indicate what data was accessed during a particular time period as well as the frequency at which the data was accessed.

In some embodiments, the field set may include one or more characteristics of usage or storage of data in the shared data repository. For example, the one or more characteristics of usage or storage of data may include any data, metadata, and/or other information related to how data is stored or used, what data is stored or used, when (including a frequency of) data is stored or used, and/or other characteristics of the data that may distinguish it from other data as well as the storing and use of the other data.

In FIG. 1, client device 102 may represent the client device of a first cloud computing systems recipient. For example, the shared data repository may be made available to multiple client devices (e.g., end users) on demand via the Internet (e.g., communication path 108 or 112) from a cloud computing system (e.g., server 114 and server 116) as opposed to end users using servers at the end user's location and/or owned by the end user. It should be noted that shared data repository 106 includes server 114 and server 116; however, shared data repository 106 may include additional components. In some embodiments, server 114 and server 116 may represent edge servers that are geographically close to a client device. In such embodiments, edge server 114 and edge server 116 may be further connected to a central server in shared data repository 106. The central server may assign and select server 114 and/or server 116 to a given client device, application, and/or end user based on the geographic location of the client device with respect to the edge server, based on the network conditions along a given network path, and/or based on other quality-of-service conditions on the network.

Furthermore, server 114 and server 116 may store different information and/or represent respective field sets. For example, server 114 may store access credentials and server 116 may store data accessed by the credentials. To respond to a request, system 100 may retrieve data from server 114 and/or server 116. Abstraction layer 110 may filter the data retrieved from server 114 and/or server 116 in order to respond to a request (e.g., from API 126 or API 128) with only data specifically authorized to be transmitted to a respective API layer, device, entity, etc.

As shown in FIG. 1, a user may use a user interface on client device 102 to access data and/or other content. As referred to herein, a "user interface" may comprise a human-computer interaction and communication in a device and may include display screens, keyboards, a mouse, and the appearance of a desktop. For example, a user interface may comprise a way a user interacts with an application or a website to access content. As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user-generated content may include content created and/or consumed by a user. For example, user-generated content may include content created by another but consumed and/or published by the user.

Shared data repository 106 may be structured according to one or more service-oriented architecture models. For example, shared data repository 106 may be designed to provide easy, scalable access to applications, resources and services and is designed to fully manage a cloud computing systems provider. In particular, shared data repository 106 may dynamically scale to meet the needs of client device 102 and client device 104. In some embodiments, shared data repository 106 may supply some or all cloud resources (e.g., hardware and software necessary for all or some of the operation of one or more cloud computing systems) to the cloud computing systems recipient. A shared data repositories provider may provide cloud computing systems such as online data storage and backup solutions, web-based email services, hosted office suites and document collaboration services, database processing, managed technical support services, and/or general computer power and data processing. In some embodiments, the cloud resource may be a network, server, storage device, application, and/or service. Notably, cloud computing system models may use a multitude of different formats, each with their own benefits and weaknesses to both the shared data repositories provider and shared data repositories recipient. In most models, these benefits and weaknesses are balanced based on the needs and/or business goals of the shared data repositories provider and shared data repositories recipient. However, through the sharing of estimated and actual usage data of the cloud computing systems recipients and shared data repositories provider, including the information on application usage in that data, the shared data repositories provider and shared data repositories recipient may better balance these weaknesses and benefits. In particular, this balance allows the shared data repositories provider and shared data repositories recipient to switch from one model to another and/or deviate from traditional model formats. These deviations can be accomplished through the apportionment methods described below. For example, by analyzing information included in the shared data (e.g., information about one or more applications that use the cloud resources), the shared data repositories provider may categorize the applications and/or the functions of those applications into authorized and unauthorized uses, the determination of which is used to further efficiently apportion shared data repositories resources.

For example, shared data repository 106 may be structured according to an infrastructure as a service (IaaS) model in which online services provide high-level APIs used to de-reference various low-level details of underlying network infrastructure like physical computing resources, location, data partitioning, scaling, security, backup etc. In such embodiments, a hypervisor runs the virtual machines as guests, and pools of hypervisors within the cloud operational system can support large numbers of virtual machines and the ability to scale services up and down according to the end users varying requirements. In such embodiments, the client device may deploy and run arbitrary software, which can include operating systems and applications. While the client device does not manage or control the underlying cloud infrastructure, it may have control over operating systems, storage, and deployed applications. IaaS-cloud providers supply these resources on demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the end user patches and maintains the operating systems and the application software, and the end user has access to virtual machines, servers, storage, load balances, etc.

Shared data repository 106 may also be structured as a platform as a service (PaaS) model. In such embodiments, shared data repository 106 deploys onto the cloud infrastructure consumer-created or consumer-acquired applications created using programming languages, libraries, services, and tools supported by the shared data repositories provider. The end user does not manage or control the underlying cloud infrastructure including the network, servers, operating systems, or storage but has control over the deployed applications and possibly configuration settings for the application-hosting environment. In this model, the end users do not manage or control the underlying cloud infrastructure including the network, servers, operating systems, or storage but have control over the deployed applications and possibly configuration settings for the application-hosting environment, and the end users have access to execution runtime codes, databases, web servers, development tools, etc.

Shared data repository 106 may also be structured as a software as a service (SaaS) model. In such embodiments, shared data repository 106 allows the end users to use the shared data repositories provider's applications running on a cloud infrastructure. The applications are accessible from various client devices through either a thin client interface, such as a web browser (e.g., web-based email) or a program interface. The end user does not manage or control the underlying cloud infrastructure including the network, servers, operating systems, storage, or even individual application capabilities, with the possible exception of limited user-specific application configuration settings.

Depending on the model or models used by the shared data repositories provider, the manner in which cloud computing systems are apportioned may change. For example, in a PaaS model, in order to apportion shared data repository resources, shared data repository 106 may install one or more applications of the first cloud computing systems recipient on hardware of a cloud computing systems provider. In another example, in a SaaS model, in order to apportion shared data repository resources, shared data repository 106 may set one or more limits for I/O operations per second for one or more applications of the first cloud computing systems recipient.

It should be noted that in some embodiments, the shared data repository may apportion cloud computing system resources according to those accustomed with other models. For example, as stated below, shared data repository 106 may receive output files that include specific information that allows shared data repository 106 to better predict actual usage of a cloud computing systems recipient as well as authorized use. Because shared data repository 106 is better able to predict actual and/or authorized use, shared data repository 106 may apportion cloud computing systems using techniques not accustomed to that model. For example, in a SaaS model, shared data repository 106 may install one or more applications of the first cloud computing systems recipient on hardware of a cloud computing systems provider. In another example, in a PaaS model, in order to apportion shared data repository resources, shared data repository 106 may set one or more limits for I/O operations per second for one or more applications of the first cloud computing systems recipient.

Figure 2:
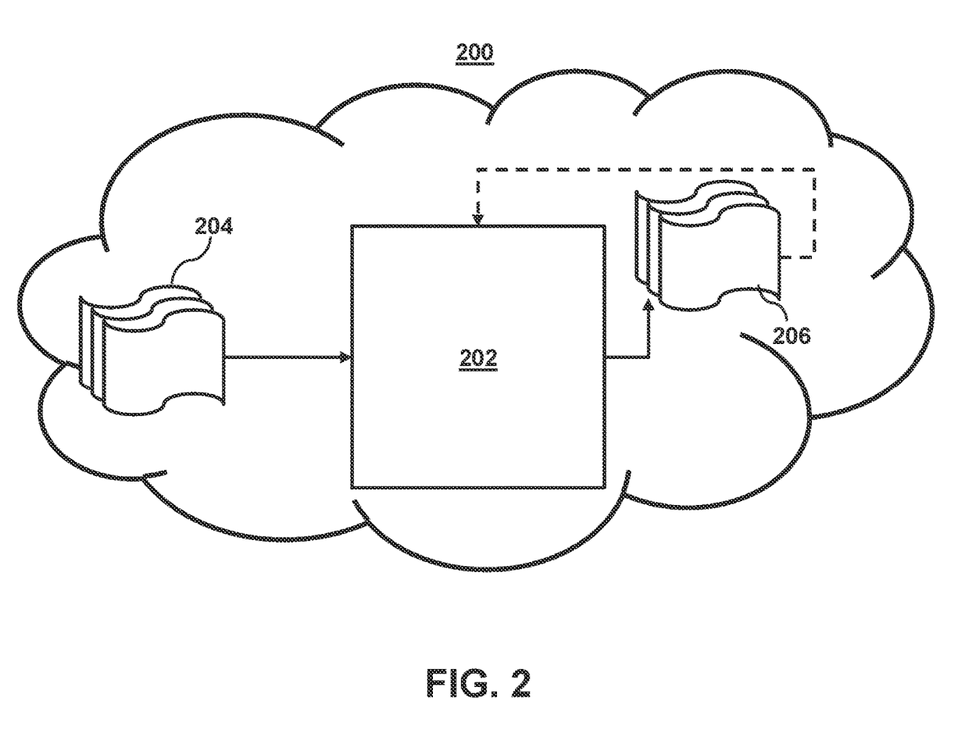
FIG. 2 shows an artificial intelligence model configured to generate field sets, in accordance with one or more embodiments.

FIG. 2 shows an artificial intelligence model configured to generate field sets, in accordance with one or more embodiments. System 200 includes artificial intelligence model 202, which may take inputs 204 and provide outputs 206. For example, inputs may include information received from output files such as an actual amount of cloud resources used by a first cloud computing systems recipient during a first time period and first time period application information. The first time period application information may include information about one or more applications that used cloud resources during the first time period. This information may further include specific information that may be accessible. For example, the information may include lengths of code of one or more applications that used cloud resources and/or a number of function calls of one or more applications that used cloud resources. This information may be compared to similar information from different time periods to determine peculiarities in the applications.

For example, cloud computing systems recipients may in some instances use cloud resources in an unauthorized manner. This unauthorized manner may include a use that is illegal and/or against the terms of use of the shared data repository. By monitoring this information, the system may detect these unauthorized uses. In another example, the terms of service of the shared data repositories provider may prevent the use of cloud resources for commercial use, training machine learning algorithms, mining cryptocurrencies, and/or other resource-intense operations. By monitoring the length of code and/or function calls, the system may determine when these unauthorized uses are occurring. For example, the shared data repositories provider may monitor the average length of code of an application performing a given function from one time period to another to detect discrepancies. Likewise, the shared data repositories provider may monitor the average number of function calls of an application performing a given function from one time period to another to detect discrepancies. If the length of code and/or function calls increases/decreases at given time period, which has correlations to higher performance of a second cloud computing systems recipient, the shared data repositories provider may detect the unauthorized use. Slight deviations as well as compensating for the actual uses of the first cloud computing systems recipient may in some embodiments necessitate large data sets that may be interpreted by the machine learning model.

In another example, inputs may also include estimated and/or actual usage data as provided by cloud computing systems recipients during various time periods. This information may be compared to similar information from different time periods to predict periods of high or lower use and/or the need for more cloud computing system resources as well as the particular cloud computing systems recipients and/or types of cloud computing systems recipients that may experience the high or low period of use. Additionally, the system may determine particular cloud computing systems recipients that have similar patterns of use. For example, if the system determines that client devices (e.g., client device 102 (FIG. 1) and client device 104 (FIG. 1)) are associated with cloud computing systems recipients that both have a high amount of use during a given time period (e.g., a weekend), the system (e.g., shared data repository 106 (FIG. 1)) may select different physical hosts and/or physical hosts located along different network routes in order to minimize resource strain. For example, in response to this determination, the system may select a first cloud computing systems physical host (e.g., server 114 (FIG. 1)) for the first cloud computing systems recipient (e.g., client device 102 (FIG. 1)) for a time period and a second cloud computing systems physical host (e.g., server 116 (FIG. 1)) for the second cloud computing systems recipient (e.g., client device 104 (FIG. 1)) for the time period based on the amount of cloud resources apportioned to the first cloud computing systems recipient for the time period and on the amount of cloud resources apportioned to the second cloud computing systems recipient for the time period (e.g., based on the predicted actual and/or authorized use of each cloud computing systems recipient).

In one use case, outputs 206 may be fed back to artificial intelligence model 202 as input to train artificial intelligence model 202 (e.g., alone or in conjunction with user indications of the accuracy of outputs 206, labels associated with the inputs, or with other reference feedback information). In another use case, artificial intelligence model 202 may update its configurations (e.g., weights, biases, or other parameters) based on its assessment of its prediction (e.g., outputs 206) and reference feedback information (e.g., user indication of accuracy, reference labels, or other information). In another use case, where artificial intelligence model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the artificial intelligence model 202 may be trained to generate better predictions.

In some embodiments, the system may use one or more prediction models to predict an actual and/or authorized use of secured data. The prediction model may include one or more artificial intelligence models, including, but not limited to, machine learning, deep learning, etc. (referred to collectively herein as "artificial intelligence models," "machine learning models," or simply "models").

As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem-solving as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
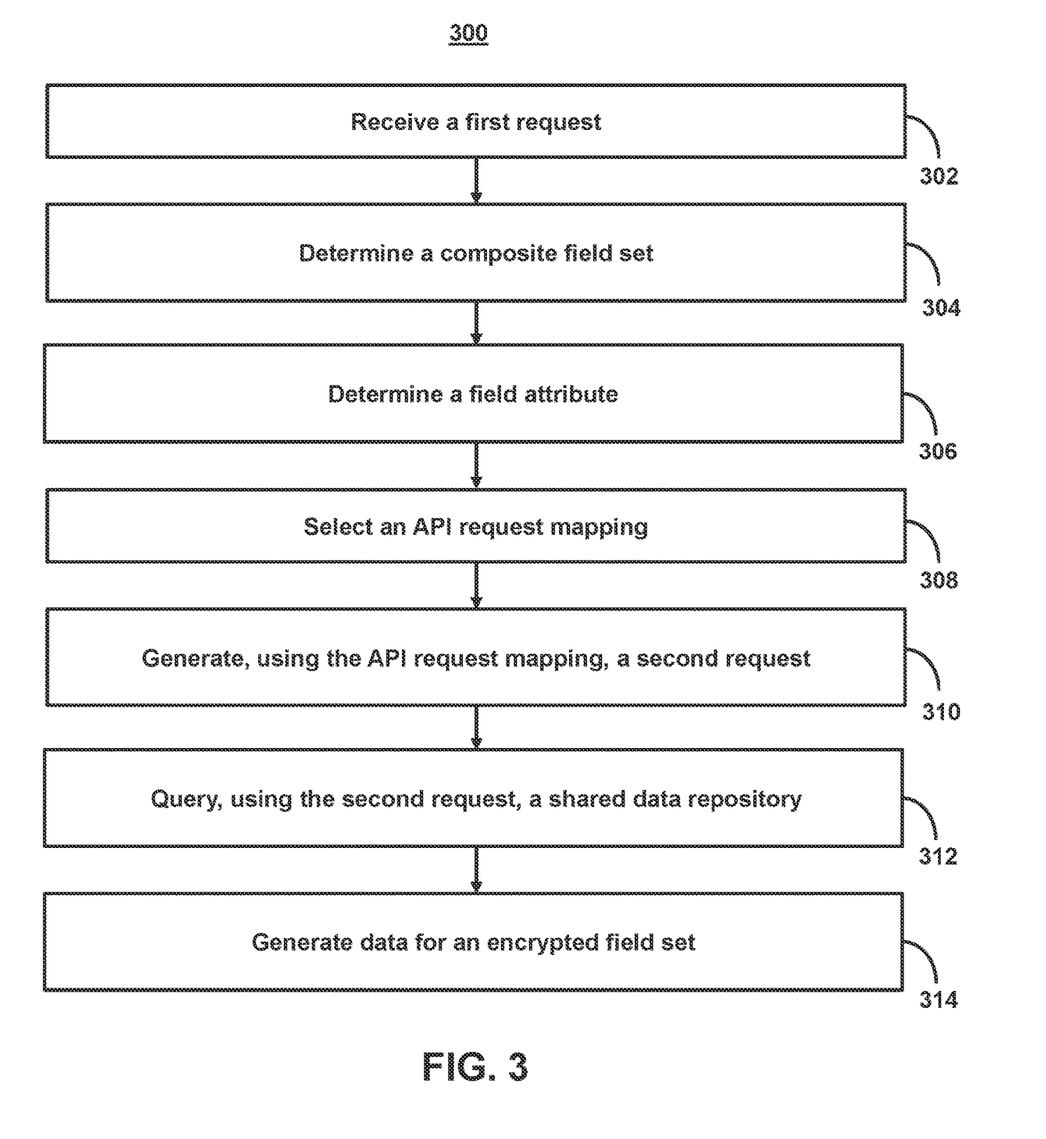
FIG. 3 shows a flowchart of the steps involved in remotely retrieving sensitive data in cloud computing systems, in accordance with one or more embodiments.

FIG. 3 shows a flowchart of the steps involved in remotely retrieving sensitive data in cloud computing systems, in accordance with one or more embodiments. For example, the system may use process 300 (e.g., as implemented on one or more system components described above) in order to remotely store security credentials in cloud computing systems featuring shared data repositories with respective field attributes using dynamically selected API request mappings.

At step 302, process 300 (e.g., using one or more components described above) receives a first request. For example, the system may receive, at an abstraction layer, a first request, from a first device, for a first encrypted field set, wherein the first encrypted field set is stored on a shared data repository for a cloud computing system. For example, the system may receive a request from a user to access a secret kept in an encrypted state in a cloud computing system.

In some embodiments, the system may receive requests from the shared data repository that secured data (e.g., a password, security certificate, etc.) is scheduled to be refreshed. Based on this schedule, the system may query the shared data repository for the refreshed data. For example, the system may receive, at the abstraction layer, a data refreshment schedule for the first encrypted field set. The system may determine, at the abstraction layer, that the first encrypted field set has been refreshed based on the data refreshment schedule. The system may transmit, by the abstraction layer to the first device, a request to retrieve the first encrypted field set.

At step 304, process 300 (e.g., using one or more components described above) determines a first composite field set. For example, the system may, in response to the first request, determine, by the abstraction layer, a first composite field set of the shared data repository that comprises the first encrypted field set. For example, in response to the first request, the system may determine where the requested field set is located (e.g., what composite field set is triggered) as well as one or more characteristics of the composite field set (e.g., a field attribute and/or one or more characteristics about the composite field set).

In some embodiments, a composite field set may be based on a user account. In such cases, the system may determine data in the user account that corresponds to the encrypted field set based on identifying a user account corresponding to the device (or user) making a request. The system may determine a particular account corresponding to the data based on an identifier transmitted in a request (e.g., entered manually or automatically), transmitted simultaneously with a request, and/or otherwise transmitted. For example, the system may receive a first device identifier corresponding to the first device. The system may determine a first user account corresponding to the first device identifier using a database, wherein the database comprises a listing of device identifiers corresponding to user accounts. The system may select the first field set in a composite field set based on the first user account.

In some embodiments, a composite field set may comprise a cloud platform. In such cases, the system may determine the cloud platform that corresponds to the encrypted field set based on identifying a cloud platform corresponding to the data at issue in a request. The system may determine a particular cloud platform corresponding to the data based on an identifier transmitted in a request (e.g., entered manually or automatically), transmitted simultaneously with a request, and/or otherwise transmitted. For example, the system may receive, in the first request, a platform identifier corresponding to the first encrypted field set. The system may determine a first cloud platform corresponding to the first encrypted field set using a database, wherein the database comprises a listing of cloud platforms storing respective field sets. The system may select the first field set in a composite field set based on the first cloud platform.

At step 306, process 300 (e.g., using one or more components described above) determines a field attribute. For example, the system may determine the one or more requirements (e.g., a functional, security, and/or specification requirement) for accessing the composite field set.

In some embodiments, the system may determine a secret management system for the composite field set. For example, the shared data repository may use one or more encrypted data management platforms (e.g., secret management platforms) to secure infrastructure secrets such as API keys, database passwords, access keys, certificates, and any type of confidential data. In order to accommodate the plurality of different encrypted data management platforms that may be encountered, the system may determine the encrypted data management platform and determine the first field attribute based on the encrypted data management platform. For example, the system may determine an encrypted data management platform corresponding to the first composite field set. The system may then determine the first field attribute based on the encrypted data management platform.

For example, an encrypted data management platform may be a secure and convenient storage system for API keys, passwords, certificates, and other sensitive data. The encrypted data management platform may provide a central place and single source of truth to manage, access, and audit secrets across cloud computing systems. For example, the encrypted data management platform may improve the system's security by removing hard-coded credentials from a program's or application's source code.

At step 308, process 300 (e.g., using one or more components described above) selects an API request mapping. For example, the system may select, based on the first request, a first API request mapping from a plurality of API request mappings. For example, in order to allow access to the encrypted data as well as to maintain security, the system may dynamically select an API request mapping for accessing the data. For example, the system may use multiple encryption techniques and/or field attributes, each of which may correspond to a given composite field set.

In some embodiments, the system may require a particular API to access the composite field set. For example, the system may determine whether a particular API request mapping may access a composite field set. To do so, the system may retrieve an identifier for the API request mapping and compare the identifier to one or more identifiers approved by the field attribute. For example, the system may determine a first API corresponding to the first request and determine that the first API request mapping corresponds to the first API.

In some embodiments, the system may select the API request mapping from a plurality of API request mappings. In such cases, the system may first determine a subset of available API request mappings that are compatible with the first field attribute. The system may then filter the compatible API request mappings for any API request mappings that are also compatible with the API of the first device. For example, the system may determine a subset of API request mappings of the plurality of API request mappings that correspond to the first field attribute. The system may determine an API of the first device. The system may filter the subset of API request mappings based on the API.

In some embodiments, the system may select the API request mapping from a plurality of API request mappings based on one or more factors. For example, the system may first determine a subset of available API request mappings that is used to access data of a given type. The system may then filter the compatible API request mappings for any API request mappings based on whether or not a given API request mapping is configured for the given type of data. For example, the system may determine a type of content of the first encrypted field set. The system may determine a subset of API request mappings of the plurality of API request mappings that correspond to the type of content. The system may select the first API request mapping from the subset of API request mappings.

In some embodiments, the system may first determine a subset of available API request mappings that are compatible with a requesting device. The system may then filter the compatible API request mappings for any API request mappings based on whether or not a given API request mapping is configured for the device type. For example, the system may determine a device type of the first device. The system may determine a subset of API request mappings of the plurality of API request mappings that correspond to the device type. The system may select the first API request mapping from the subset of API request mappings.

In some embodiments, the system may select an API request mapping based on processing, storage, and/or other computer resource requirements. For example, the system may determine how quickly data must be retrieved. The system may then select an API request mapping that may provide that performance. For example, the system may determine a processing speed requirement of the first request. The system may determine a subset of API request mappings of the plurality of API request mappings that correspond to the processing speed requirement. The system may select the first API request mapping from the subset of API request mappings.

In some embodiments, the system may select an API request mapping based on security protocols. For example, the system may determine data must be retrieved in a manner that maintains a required level of security. The system may then select an API request mapping that provides that level of security. For example, the system may determine a security protocol of the first request. The system may determine a subset of API request mappings of the plurality of API request mappings that correspond to the security protocol. The system may select the first API request mapping from the subset of API request mappings.

At step 310, process 300 (e.g., using one or more components described above) generates, using the first API request mapping, a second request. For example, the system may generate, using the first API request mapping, a second request corresponding to the first field attribute. In some embodiments, the system may use the first API request mapping to generate a request for accessing the encrypted field set. For example, the API request mapping may provide a role-based access control model. In such cases, entities (e.g., systems, composite field sets, users, course categories, courses, modules, data sets, accounts, and/or other segments of data) are represented by contexts that are arranged in a tree-like hierarchy (e.g., a context tree). The system may use roles to set capability definitions for each request, in which each capability usually represents an ability of the user to do one or more functions. The system may also define roles at the topmost system context level. Alternatively or additionally, the system may dynamically determine role definitions that may be modified and/or changed at lower context levels. For example, a user access control may be calculated from the definitions of roles assigned to users.

At step 312, process 300 (e.g., using one or more components described above) queries, using the second request, a shared data repository. For example, the system may query, using the second request, the shared data repository for the first encrypted field set. For example, the system may then use a request that is generated to correspond to the field attribute for the specific composite field set to request the encrypted data from the composite field set.

In some embodiments, the system may require a particular client to access the composite field set. For example, the system may determine whether a particular client may access a composite field set. To do so, the system may retrieve an identifier for the client and compare the identifier to one or more identifiers approved by the field attribute. For example, the system may select, based on the first request, a first computer client of a plurality of computer clients. The system may then determine to query the shared data repository for the first encrypted field set using the first computer client as a proxy.

The client may be a piece of computer hardware or software that accesses a service made available by a server as part of the client-server model of computer networks. The server may be another computer system, in which case the client accesses the service by way of the network. For example, the system may require that the request for data is transmitted using a specific client in order to improve security.

At step 314, process 300 (e.g., using one or more components described above) generates data for an encrypted field set. For example, the system may generate for display, on a user interface of the first device, data for the first encrypted field set. In some embodiments, the system may determine that the composite field set comprises the first encrypted field set and a second first encrypted field set. The system may therefore generate a second request that returns only the first encrypted field set. Accordingly, only data for the first encrypted field set is retrieved by the first device.

For example, the system may generate for display, on a user interface of the first device, a first decrypted field set corresponding to the first encrypted field set. For example, the system may generate the data in a human-readable format to allow a user on the first device to view, access, and/or otherwise use the data.

In some embodiments, the first decrypted field set may comprise a decryption key for a second encrypted field set. For example, the system may retrieve sensitive data such as passwords, database credentials, API keys, SSH keys, and/or TLS certifications. The system may allow a user to remotely retrieve this sensitive data and use the sensitive data to retrieve other data. For example, the system may generate, based on the decryption key, a third request for the second encrypted file. The system may query, using the third request, the shared data repository for the second encrypted field set. The system may generate for display, on the user interface of the first device, a second decrypted field set corresponding to the second encrypted field set.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 3.

Figure 4:
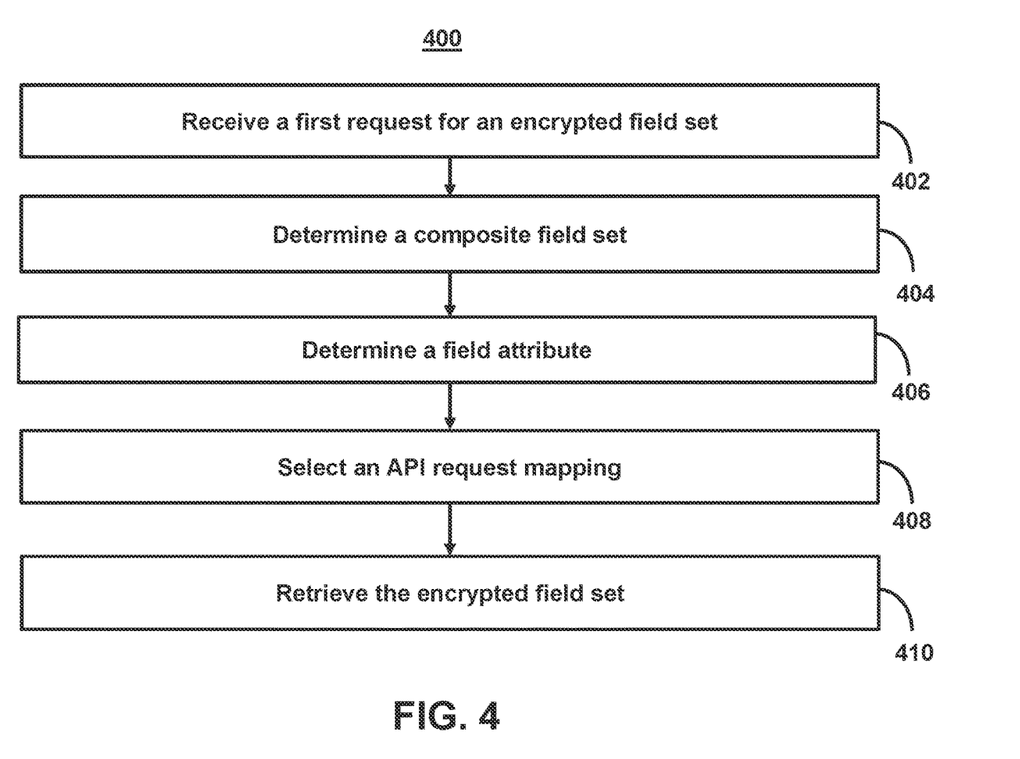
FIG. 4 shows a flowchart of the steps involved in remotely monitoring secured data in cloud computing systems, in accordance with one or more embodiments.

FIG. 4 shows a flowchart of the steps involved in remotely monitoring secured data in cloud computing systems, in accordance with one or more embodiments. For example, the system may use process 400 (e.g., as implemented on one or more system components described above) in order to remotely monitor secured data in cloud computing systems featuring shared data repositories with respective field attributes using dynamically selected API request mappings.

At step 402, process 400 (e.g., using one or more components described above) receives a first request for a first encrypted field set. For example, the system may receive, at an abstraction layer, a first request for a first encrypted field set, wherein the first encrypted field set is stored in a shared data repository for a cloud computing system, and wherein the first encrypted field set indicates one or more characteristics of usage or storage of the first encrypted field set in the shared data repository. For example, the system may comprise a fully managed cloud-based, zero-knowledge platform for securing infrastructure secrets such as API keys, database passwords, access keys, certificates, and any type of confidential data. The abstraction layer may be used to monitor access and use of secured data in order to maintain security and detect breaches. As such, the system may receive requests for information about the usage and storage of data in the encrypted field set.

In some embodiments, the system may receive requests from the shared data repository that secured data (e.g., a password, security certificate, etc.) has been updated. In response, the system may query the shared data repository for the updated data. For example, the system may, in response to the first request, transmit the first request to a first user device. The system may receive, at the abstraction layer, a first request, from the first device, to retrieve the first encrypted field set.

In some embodiments, the system may receive requests from the shared data repository that secured data (e.g., a password, security certificate, etc.) is scheduled to be refreshed. Based on this schedule, the system may query the shared data repository for the refreshed data. For example, the system may receive, at the abstraction layer, a data refreshment schedule. The system may determine, at the abstraction layer, that the first encrypted field set has been refreshed based on the data refreshment schedule. The system may transmit, by the abstraction layer, a first request, from a first device, to retrieve the first encrypted field set.

At step 404, process 400 (e.g., using one or more components described above) determines a first composite field set. For example, the system may, in response to the first request, determine, by the abstraction layer, a first composite field set of the shared data repository that comprises the first encrypted field set. For example, in response to the first request, the system may determine where the requested field set is located (e.g., what composite field set) as well as one or more characteristics of the composite field set (e.g., a field attribute and/or one or more characteristics about the composite field set). The system may use these characteristics to determine how to access the system in order to receive information about the use and storage of secured data.

In some embodiments, a composite field set may comprise data in a user account such as PII. In such cases, the system may determine the user account that corresponds to the encrypted field set based on identifying a user account corresponding to the device (or user) making a request. The system may determine a particular account corresponding to the data based on an identifier transmitted in a request (e.g., entered manually or automatically), transmitted simultaneously with a request, and/or otherwise transmitted.

In some embodiments, a composite field set may comprise a cloud platform. In such cases, the system may determine the cloud platform that corresponds to the encrypted field set based on identifying a cloud platform corresponding to the data at issue in a request. The system may determine a particular cloud platform corresponding to the data based on an identifier transmitted in a request (e.g., entered manually or automatically), transmitted simultaneously with a request, and/or otherwise transmitted.

At step 406, process 400 (e.g., using one or more components described above) determines a field attribute. For example, the system may determine a first field attribute for the first composite field set. For example, the system may determine the one or more requirements (e.g., a functional, security, and/or specification requirement) for accessing the composite field set. The system may use these requirements to determine how to access the system in order to receive information about the use and storage of secured data.

In some embodiments, the system may determine a secret management system for the composite field set. For example, shared data repository may use one or more encrypted data management platforms (e.g., secret management platforms) to secure infrastructure secrets such as API keys, database passwords, access keys, certificates, and any type of confidential data. In order to accommodate the plurality of different encrypted data management platforms that may be encountered, the system may determine the encrypted data management platform and determine the first field attribute based on the encrypted data management platform.

For example, an encrypted data management platform may be a secure and convenient storage system for API keys, passwords, certificates, and other sensitive data. The encrypted data management platform may provide a central place and single source of truth to manage, access, and audit secrets across cloud computing systems. For example, the encrypted data management platform may improve the system's security by removing hard-coded credentials from a program's or application's source code.

At step 408, process 400 (e.g., using one or more components described above) selects an API request mapping. For example, the system may select, based on the first request, a first API request mapping from a plurality of API request mappings. For example, in order to allow access to the encrypted data as well as to maintain security, the system may dynamically select an API request mapping for accessing the data. For example, the system may use multiple encryption techniques and/or field attributes, each of which may correspond to a given composite field set. The system may determine an API request mapping that corresponds to these protocols. The system may then use the API request mapping to retrieve the field set.

At step 410, process 400 (e.g., using one or more components described above) retrieves the encrypted field set. For example, the system may retrieve, using the first API request mapping, the first encrypted field set. For example, the system may use the dynamically selected API request mapping to retrieve the first encrypted field set. The dynamically selected API request mapping may interact with the shared data repository to receive information about the storage and use of secured data.

For example, as the shared data repository may use one or more security protocols, the system may use the dynamically selected API request mapping to generate a request that meets the protocol and then query the system with the request. The system may generate, using the first API request mapping, a second request corresponding to the first field attribute. The system may query, using the second request, the shared data repository for the first encrypted field set.

In some embodiments, the system may generate a recommendation based on the encrypted field set. For example, the system may generate for display, on a user interface, a first recommendation based on the first encrypted field set. For example, the system may generate a recommendation based on the one or more characteristics of usage or storage of the first encrypted field set. In some embodiments, the system may select information in the recommendation based on the initial request.

In some embodiments, the system may generate a recommendation that indicates a particular device that accessed specific data, composite field sets, etc. For example, in response to a request that queries the system for this specific data, the system may generate a recommendation that responds to the query. In such cases, the system may receive the device identifier as part of the initial user request. For example, the system may request information on whether a specific device (or what devices) has accessed the secured data. For example, the system may retrieve from the first encrypted field set a device identifier for a device that previously accessed the first encrypted field set. The system may determine the first recommendation based on the device identifier.

In some embodiments, the system may generate a recommendation that indicates a frequency at which specific data, composite field sets, etc., were accessed. For example, in response to a request that queries the system for this specific data, the system may generate a recommendation that responds to the query. In such cases, the system may receive a time period as part of the initial user request. For example, the system may request information on a frequency at which data was accessed during the time period. For example, the system may retrieve from the first encrypted field set a first frequency at which the first encrypted field set is accessed from the cloud computing service. The system may determine the first recommendation based on the first frequency.

In some embodiments, the system may generate a recommendation that indicates whether or not securely stored data has been subject to a data breach. For example, in response to a request that queries the system for this specific data, the system may generate a recommendation that responds to the query. In such cases, the system may retrieve the specific data and compare it to data in known data breaches. For example, the system may generate the data in a human-readable format to allow a user on the first device to view, access, and/or otherwise use the data (e.g., compare it data in known data breaches). For example, the system may generate first decrypted field set corresponding to the first encrypted field set. The system may compare the first decrypted field set to data in known data breaches to determine whether the first encrypted field set is subject to a data breach.

In some embodiments, the system may generate a recommendation that indicates a particular location (e.g., a field in a composite field set) at which specific data is stored. For example, in response to a request that queries the system for this specific data, the system may generate a recommendation that responds to the query. In such cases, the system may receive the field set identifier when determining the first composite field set of the shared data repository that comprises the first encrypted field set. For example, the system may request information on where specific data is stored. For example, the system may retrieve from the first encrypted field set a field set identifier in the first composite field set. The system may determine the first recommendation based on the composite field set identifier.

In some embodiments, the system may generate a recommendation that indicates the one or more operations (e.g., read, write, etc.) that were performed on specific data, composite field sets, etc. For example, in response to a request that queries the system for this specific data, the system may generate a recommendation that responds to the query. In such cases, the system may determine what operations (if any) were performed on the data as part of the initial user request. The system may then generate a log of the one or more operations. For example, the system may retrieve from the first encrypted field set an operation log of operations performed on the first encrypted field set. The system may determine the first recommendation based on the operation log.

In some embodiments, the system may generate a recommendation that indicates a frequency at which secured data is refreshed. For example, refreshing data (or changing passwords, security protocols, security certificates, etc.) is a key element of maintaining a high level of security. For example, in response to a request that queries the system for this specific data, the system may generate a recommendation that responds to the query. In such cases, the system may receive a time period as part of the initial user request. For example, the system may request information on a frequency at which data was refreshed during the time period. For example, the system may retrieve from the first encrypted field set a first frequency at which the first encrypted field set is refreshed on the cloud computing service. The system may determine the first recommendation based on the first frequency.

In some embodiments, the system may generate a recommendation that indicates a particular type of security (or security protocols) through which specific data is stored. For example, in response to a request that queries the system for this specific data, the system may generate a recommendation that responds to the query. In such cases, the system may receive the field attribute identifier when determining the first field attribute of the shared data repository that comprises the first encrypted field set. For example, the system may retrieve from the first encrypted field set a field attribute identifier for the first field attribute. The system may determine the first recommendation based on the field attribute identifier.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of remotely retrieving sensitive data or monitoring secured data in cloud computing systems featuring shared data repositories accessible from a plurality of application programming interfaces (APIs).

2. The method of the preceding embodiment, the method comprising: receiving, at an abstraction layer, a first request, from a first device, for a first encrypted field set, wherein the first encrypted field set is stored on a shared data repository for a cloud computing system; in response to the first request, determining, by the abstraction layer, a first composite field set of the shared data repository that comprises the first encrypted field set, wherein the first composite field set comprises the first encrypted field set and a second encrypted field set; determining a first field attribute for the first composite field set; selecting, based on the first request, a first API request mapping from a plurality of API request mappings; generating, using the first API request mapping, a second request corresponding to the first field attribute; querying, using the second request, the shared data repository for the first encrypted field set; and generating for display, on a user interface of the first device, data for the first encrypted field set.

3. The method of any one of the preceding embodiments, wherein selecting the first API request mapping from the plurality of API request mappings further comprises: determining a first API corresponding to the first request; and determining that the first API request mapping corresponds to the first API.

4. The method of any one of the preceding embodiments, further comprising: selecting, based on the first request, a first computer client of a plurality of computer clients; and determining to query the shared data repository for the first encrypted field set using the first computer client as a proxy.

5. The method of any one of the preceding embodiments, wherein determining the first field attribute for the first composite field set further comprises: determining an encrypted data management platform corresponding to the first composite field set; and determining the first field attribute based on the encrypted data management platform.

6. The method of any one of the preceding embodiments, wherein generating for display the data for the first encrypted field set further comprises: determining a first decrypted field set corresponding to the first encrypted field set, wherein the first decrypted field set comprises a decryption key for a second encrypted field set; generating, based on the decryption key, a third request for the second encrypted field set; querying, using the third request, the shared data repository for the second encrypted field set; and generating for display, on the user interface of the first device, a second decrypted field set corresponding to the second encrypted field set.

7. The method of any one of the preceding embodiments, wherein determining, by the abstraction layer, the first composite field set of the shared data repository that comprises the first encrypted field set further comprises: receiving a first device identifier corresponding to the first device; determining a first user account corresponding to the first device identifier using a database, wherein the database comprises a listing of device identifiers corresponding to user accounts; and selecting the first composite field set based on the first user account.

8. The method of any one of the preceding embodiments, wherein determining, by the abstraction layer, the first composite field set of the shared data repository that comprises the first encrypted field set further comprises: receiving, in the first request, a platform identifier corresponding to the first encrypted field set; determining a first cloud platform corresponding to the first encrypted field set using a database, wherein the database comprises a listing of cloud platforms storing respective field sets; and selecting the first composite field set based on the first cloud platform.

9. The method of any one of the preceding embodiments, wherein selecting, based on the first request, the first API request mapping from the plurality of API request mappings further comprises: determining a subset of API request mappings of the plurality of API request mappings that correspond to the first field attribute; determining an API of the first device; and filtering the subset of API request mappings based on the API.

10. The method of any one of the preceding embodiments, wherein selecting, based on the first request, the first API request mapping from the plurality of API request mappings further comprises: determining a type of content of the first encrypted field set; determining a subset of API request mappings of the plurality of API request mappings that correspond to the type of content; and selecting the first API request mapping from the subset of API request mappings.

11. The method of any one of the preceding embodiments, wherein selecting, based on the first request, the first API request mapping from the plurality of API request mappings further comprises: determining a device type of the first device; determining a subset of API request mappings of the plurality of API request mappings that correspond to the device type; and selecting the first API request mapping from the subset of API request mappings.

12. The method of any one of the preceding embodiments, wherein selecting, based on the first request, the first API request mapping from the plurality of API request mappings further comprises: determining a processing speed requirement of the first request; determining a subset of API request mappings of the plurality of API request mappings that correspond to the processing speed requirement; and selecting the first API request mapping from the subset of API request mappings.

13. The method of any one of the preceding embodiments, wherein selecting, based on the first request, the first API request mapping from the plurality of API request mappings further comprises: determining a security protocol of the first request; determining a subset of API request mappings of the plurality of API request mappings that correspond to the security protocol; and selecting the first API request mapping from the subset of API request mappings.

14. The method of any one of the preceding embodiments, further comprising: receiving, at the abstraction layer, a data refreshment schedule for the first encrypted field set; determining, at the abstraction layer, that the first encrypted field set has been refreshed based on the data refreshment schedule; and transmitting, by the abstraction layer to the first device, a request to retrieve the first encrypted field set.

15. A non-transitory, computer-readable medium storing instructions that, when executed by a data processing apparatus, cause the data processing apparatus to perform operations comprising those of any of embodiments 1-14.

16. A system comprising one or more processors and memory storing instructions that, when executed by the processors, cause the processors to effectuate operations comprising those of any of embodiments 1-14.

17. A system comprising means for performing any of embodiments 1-14.

What is claimed is:

1. A system for remotely retrieving sensitive data in cloud computing systems featuring shared data repositories accessible from a plurality of application programming interfaces (APIs), the system comprising:
one or more processors; and
a non-transitory, computer-readable medium comprising instructions recorded thereon that when executed by the one or more processors cause operations comprising:
receiving, at an abstraction layer, a first API request, from a first device, for a first encrypted field set, wherein the first encrypted field set is stored on a shared data repository for a cloud computing system, wherein the abstraction layer comprises an API layer that performs one or more functions related to storing or monitoring security credentials or other secured data;
in response to the first API request, determining, by the abstraction layer, a first composite field set of the shared data repository that comprises the first encrypted field set, wherein the first composite field set comprises the first encrypted field set and a second encrypted field set;
determining, by the abstraction layer, a first field attribute for the first composite field set;
selecting, by the abstraction layer, a first API request mapping from a plurality of API request mappings based on the first API request, wherein each of the plurality of API request mappings comprises a respective function template for an API parser and API server;
reinterpreting the first API request to generate, by the abstraction layer, a second API request corresponding to the first field attribute using the first API request mapping, wherein the second API request modifies the first API request to exclude the second encrypted field set;
querying, by the abstraction layer, the shared data repository for the first encrypted field set using the second API request;
receiving, by the abstraction layer, data for the first encrypted field set in response to the second API request without data for the second encrypted field set; and
generating for display, on a user interface of the first device, the data for the first encrypted field set.

2. A method of remotely retrieving sensitive data in cloud computing systems featuring shared data repositories accessible from a plurality of application programming interfaces (APIs), the method comprising:
receiving, at an abstraction layer, a first API request, from a first device, for a first encrypted field set, wherein the first encrypted field set is stored on a shared data repository for a cloud computing system, wherein the abstraction layer comprises an API layer that performs one or more functions related to storing or monitoring security credentials or other secured data;
in response to the first API request, determining, by the abstraction layer, a first composite field set of the shared data repository that comprises the first encrypted field set, wherein the first composite field set comprises the first encrypted field set and a second encrypted field set;
determining a first field attribute for the first composite field set;
selecting, based on the first API request, a first API request mapping from a plurality of API request mappings, wherein each of the plurality of API request mappings comprises a respective function template for an API parser and API server;
reinterpreting the first API request to generate, using the first API request mapping, a second API request corresponding to the first field attribute;
querying, using the second API request, the shared data repository for the first encrypted field set;
receiving, by the abstraction layer, data for the first encrypted field set in response to the second API request; and
generating for display, on a user interface of the first device, the data for the first encrypted field set.

3. The method of claim 2, wherein selecting the first API request mapping from the plurality of API request mappings further comprises:
determining a first API corresponding to the first API request; and
determining that the first API request mapping corresponds to the first API.

4. The method of claim 2, further comprising:
selecting, based on the first API request, a first computer client of a plurality of computer clients; and
determining to query the shared data repository for the first encrypted field set using the first computer client as a proxy.

5. The method of claim 2, wherein determining the first field attribute for the first composite field set further comprises:
determining an encrypted data management platform corresponding to the first composite field set; and
determining the first field attribute based on the encrypted data management platform.

6. The method of claim 2, wherein generating for display the data for the first encrypted field set further comprises:
determining a first decrypted field set corresponding to the first encrypted field set, wherein the first decrypted field set comprises a decryption key for a second encrypted field set;
generating, based on the decryption key, a third API request for the second encrypted field set;
querying, using the third API request, the shared data repository for the second encrypted field set; and
generating for display, on the user interface of the first device, a second decrypted field set corresponding to the second encrypted field set.

7. The method of claim 2, wherein determining, by the abstraction layer, the first composite field set of the shared data repository that comprises the first encrypted field set further comprises:
receiving a first device identifier corresponding to the first device;
determining a first user account corresponding to the first device identifier using a database, wherein the database comprises a listing of device identifiers corresponding to user accounts; and
selecting the first composite field set based on the first user account.

8. The method of claim 2, wherein determining, by the abstraction layer, the first composite field set of the shared data repository that comprises the first encrypted field set further comprises:
receiving, in the first API request, a platform identifier corresponding to the first encrypted field set;

determining a first cloud platform corresponding to the first encrypted field set using a database, wherein the database comprises a listing of cloud platforms storing respective field sets; and selecting the first composite field set based on the first cloud platform.

9. The method of claim 2, wherein selecting, based on the first API request, the first API request mapping from the plurality of API request mappings further comprises:

determining a subset of API request mappings of the plurality of API request mappings that correspond to the first field attribute;

determining an API of the first device; and filtering the subset of API request mappings based on the API.

10. The method of claim 2, wherein selecting, based on the first API request, the first API request mapping from the plurality of API request mappings further comprises:

determining a type of content of the first encrypted field set;

determining a subset of API request mappings of the plurality of API request mappings that correspond to the type of content; and selecting the first API request mapping from the subset of API request mappings.

11. The method of claim 2, wherein selecting, based on the first API request, the first API request mapping from the plurality of API request mappings further comprises:

determining a device type of the first device;

determining a subset of API request mappings of the plurality of API request mappings that correspond to the device type; and selecting the first API request mapping from the subset of API request mappings.

12. The method of claim 2, wherein selecting, based on the first API request, the first API request mapping from the plurality of API request mappings further comprises:

determining a processing speed requirement of the first API request;

determining a subset of API request mappings of the plurality of API request mappings that correspond to the processing speed requirement; and selecting the first API request mapping from the subset of API request mappings.

13. The method of claim 2, wherein selecting, based on the first API request, the first API request mapping from the plurality of API request mappings further comprises:

determining a security protocol of the first API request;

determining a subset of API request mappings of the plurality of API request mappings that correspond to the security protocol; and selecting the first API request mapping from the subset of API request mappings.

14. The method of claim 2, further comprising:

receiving, at the abstraction layer, a data refreshment schedule for the first encrypted field set;

determining, at the abstraction layer, that the first encrypted field set has been refreshed based on the data refreshment schedule; and transmitting, by the abstraction layer to the first device, a fourth API request to retrieve the first encrypted field set.

15. One or more non-transitory, computer-readable mediums comprising instructions recorded thereon that when executed by one or more processors cause operations comprising:

receiving, at an abstraction layer, a first API request, from a first device, for a first encrypted field set, wherein the first encrypted field set is stored on a shared data repository for a cloud computing system, wherein the abstraction layer comprises an API layer that performs one or more functions related to storing or monitoring security credentials or other secured data;

in response to the first API request, determining, by the abstraction layer, a first composite field set of the shared data repository that comprises the first encrypted field set;

determining a first field attribute for the first composite field set;

selecting, based on the first API request, a first API request mapping from a plurality of API request mappings, wherein each of the plurality of API request mappings comprises a respective function template for an API parser and API server;

reinterpreting the first API request to generate, using the first API request mapping, a second API request corresponding to the first field attribute;

querying, using the second API request, the shared data repository for the first encrypted field set;

receiving, by the abstraction layer, data for the first encrypted field set in response to the second API request; and generating for display, on a user interface of the first device, the data for the first encrypted field set.

16. The one or more non-transitory, computer-readable mediums of claim 15, wherein selecting the first API request mapping from the plurality of API request mappings further comprises:

determining a first API corresponding to the first API request; and determining that the first API request mapping corresponds to the first API.

17. The one or more non-transitory, computer-readable mediums of claim 15, wherein the instructions further cause operations comprising:

selecting, based on the first API request a first computer client of a plurality of computer clients; and determining to query the shared data repository for the first encrypted field set using the first computer client as a proxy.

18. The one or more non-transitory, computer-readable mediums of claim 15, wherein determining the first field attribute for the first composite field set further comprises:

determining an encrypted data management platform corresponding to the first composite field set; and determining the first field attribute based on the encrypted data management platform.

19. The one or more non-transitory, computer-readable mediums of claim 15, wherein generating for display the data for the first encrypted field set further comprises:

determining a first decrypted field set corresponding to the first encrypted field set, wherein the first decrypted field set comprises a decryption key for a second encrypted field set;

generating, based on the decryption key, a third API request for the second encrypted field set;

querying, using the third API request, the shared data repository for the second encrypted field set; and generating for display, on the user interface of the first device, a second decrypted field set corresponding to the second encrypted field set.

20. The one or more non-transitory, computer-readable mediums of claim 15, wherein determining, by the abstraction layer, the first composite field set of the shared data repository that comprises the first encrypted field set further comprises:
- receiving a first device identifier corresponding to the first device;
- determining a first user account corresponding to the first device identifier using a database, wherein the database comprises a listing of device identifiers corresponding to user accounts; and
- selecting the first composite field set based on the first user account.

* * * * *